(12) United States Patent
Chan (10) Patent No.: US 7,516,154 B2
(45) Date of Patent: Apr. 7, 2009

(54) CROSS LANGUAGE ADVERTISING (75) Inventor: Ning-Ping Chan, El Cerrito, CA (US)

(73) Assignee: qNaturally Systems Inc., Berkeley, CA (US)

( * ) Notice: Subject to any disclaimer, the term of this patent is extended or adjusted under 35 U.S.C. 154(b) by 66 days.

(21) Appl. No.: 11/349,762

(22) Filed: Feb. 8, 2006

(65) Prior Publication Data

US 2006/0129424 A1   Jun. 15, 2006

Related U.S. Application Data

(60) Continuation-in-part of application No. 10/449,740, filed on May 29, 2003, now abandoned, which is a division of application No. 09/606,655, filed on Jun. 28, 2000, now Pat. No. 6,604,101.

(51) Int. Cl.
*G06F 17/00* (2006.01)
(52) U.S. Cl. .................. 707/102; 707/100; 707/101; 707/3; 707/10
(58) Field of Classification Search .............. 707/3, 707/10, 100–102
See application file for complete search history.

(56) References Cited

U.S. PATENT DOCUMENTS

| 6,024,571 | A | * | 2/2000 | Renegar | 434/157 |
| 6,347,316 | B1 | * | 2/2002 | Redpath | 707/10 |
| 7,185,044 | B2 | * | 2/2007 | Ryan et al. | 709/200 |
| 2002/0152202 | A1 | * | 10/2002 | Perro et al. | 707/3 |

* cited by examiner

*Primary Examiner*—Sana Al-Hashemi
(74) *Attorney, Agent, or Firm*—Dahyee Law Group; Leon E. Jew (57) ABSTRACT

Disclosed is a method and system for providing cross language advertising service over the Internet. In one preferred embodiment, while a user is performing a cross language search on the Internet, she receives the search results and concurrently receives one or more advertisements in her input language which are relevant to her input. In another preferred embodiment, while a user is requesting a real-time translation or annotation service on the Internet, she receives the requested translation or annotation and concurrently receives one or more advertisements in the annotation language which are relevant to her input.

20 Claims, 4 Drawing Sheets

CROSS LANGUAGE ADVERTISING

CROSS REFERENCE TO RELATED APPLICATIONS

This application is a continuation-in-part of and claims the benefit of priority to U.S. patent application Ser. No. 10/449,740, entitled "Method and system for translingual translation of query and search and retrieval of multilingual information on the web," filed on May 29, 2003 now abandoned, which, as a divisional application, in turn claims the benefit of priority to U.S. patent application Ser. No. 09/606,655, entitled "Method and system for translingual translation of query and search and retrieval of multilingual information on a computer network," filed on Jun. 28, 2000, now issued as U.S. Pat. No. 6,604,101, the contents of which are incorporated in their entirety by reference herein.

The application is also related to U.S. patent application Ser. No. 10/876,206, entitled "Method of decomposing prose elements in document processing," filed on Jun. 23, 2004, U.S. patent application Ser. No. 11/173,276, entitled "Variant Standardization Engine," filed on Jul. 1, 2005, U.S. patent application Ser. No. 10/529,089, entitled "Blinking annotation callouts highlighting cross language search results", filed on Mar. 24, 2005, which claims benefit of U.S. provisional application Ser. No. 60/414,624 filed on Sep. 30, 2002, and U.S. patent application Ser. No. 10/529,087, entitled "Pointer initiated instant bilingual annotation on textual information in an electronic document", filed on Sep. 12, 2005, which claims benefit of U.S. provisional application Ser. No. 60/414,623, the contents of which are incorporated in their entirety by reference herein.

BACKGROUND OF THE INVENTION

1. Technical Field of the Invention

This invention relates generally to cross language applications in an Internet based environment and more particularly to a method and system for providing cross language advertising service over the Internet.

2. Description of Prior Art

U.S. Pat. No. 6,604,101 disclosed a system for cross-language search. The system dialectally standardizes the keyword or query input by the user to a more commonly known or used term. Dialectal standardization is helpful because standardizing the word to a commonly known word insures that the search engine of the target language will recognize it.

The patent also disclosed a method and system that translates intelligently the standardized keyword or query input by the user in a source language into the target language. It also provided an option to the users to have the search results retrieved in the target language to be translated back into the source language.

U.S. patent application Ser. No. 10/449,740 discloses a method for dialectally standardizing a query input by the user in the source language and then translating the standardized keyword to the target language and searching and retrieving web documents in the target language as well as providing translations of the search results into the source language.

In the method, the user first inputs a query in the source language through an input device such as a keyboard. The query is then processed by a server at the backend to extract content word from the input query. The next step takes place at a dialectal controller, which performs the function of dialectally standardizing the content word extracted from the input query. This insures that the keyword is standardized to a commonly known word or term. At this stage, the user may be prompted for some more input so as to refine the search or to perform dialectal standardization where the initial input phrase by the user was insufficient to perform dialectal standardization.

Thereafter, the dialectally standardized word is inputted into a translator to translate the dialectally standardized word into the target language. This process of translation that takes place prior to a search is known as pre-search engine translation. Following the translation, the translated word is input into a search engine in the target language. Such an input yields search results in the target language that satisfy one or more search criteria. The search results so obtained are then displayed in the form of site names (URL) on the user's screen.

Once the search results are made available to the user, the user has a set of available options. The user may either browse the search results in the target language or request that the search results obtained in the target language be translated into the source language. The user may further specify whether the entire search results or just portions of it need to be translated. This can be done by merely highlighting the portions of the search results desired to be translated and then entering the appropriate command. The user may also specify as to what kind of a translation is required by the user depending on her needs, i.e., whether a simple machine translation with reading aids will be sufficient or a more intelligible translation of the search results and the contents of those web sites is desired.

U.S. patent application Ser. No. 10/529,087 discloses a bilingual linguistic annotation calibration engine (LACE) comprising a system and method for automatically returning a user from a web server an artificial intelligence based bilingual annotation, displayed in a callout or bubble, on a segment of textual information, such as a phrase, a keyword, or a sentence, contained in a segment of text adjacent to or overlaid by the user's mouse pointer while the user is viewing an electronic document on the computer screen.

The LACE system returns in real-time to the user from a backend server a bilingual annotation message, contained in a callout associated with the user's mouse pointer, on a segment of textual information while the user, who is reading a web page displayed on the computer screen, moves the mouse pointer over, or points the mouse pointer to, a segment of text containing the segment of textual information.

This LACE system involves a software application which runs on the backend server of the web site and operates to perform the steps such as: screen-scraping a segment of text adjacent to, or overlaid by, the user's mouse pointer, the segment of text being included in a web page in an object language; sending the screen-scraped segment of text to the backend server hosting the web page; calibrating the screen-scraped segment of text into a query; translating the query into a subject language; returning the user's computer the data required for displaying the query and its translation (even other reading aid information) in a callout closely associated with the user's mouse pointer; and displaying the callout according to a signal sent from the server.

It is desired that while the user is performing a cross language search or while he is requesting a real-time annotation or translation through LACE system, the server which supports the cross language search or the LACE system, or a third party server, will return to the user one or more advertisements relevant to his input.

SUMMARY OF THE INVENTION

Therefore, the object of the invention is to send a user one or more advertisements in his native language, also called as source language, over the Internet while the user is performing a cross language search or while he is requesting a real-time annotation or translation through the LACE system. The advertisements sent to the user are relevant to the user's query input. In a cross language search situation, the keyword or content word extracted from the query input is used to trigger the advertising. In a LACE situation, the keyword or content word extracted from the screen-scraped segment of textual information is used to trigger the advertising.

In the first preferred embodiment, the invention teaches a method and system for providing cross language advertising for a user while the user is performing a contextual search and retrieval of documents in a computer network such as the Internet. The system performs the following operation steps:

receiving from the user a query in a first language through an input device;

processing the query to extract at least one content word from the query;

performing a dialectal standardization of the content word extracted from the query;

translating the dialectally standardized content word into a target language through a translator;

performing a contextual search in the target language based on the translated content word, using a search engine in the target language;

returning to the user the search results in the target language in the form of at least one of site names (URLs) and documents;

searching a database of advertisements; and returning to the user one or more of the advertisements relevant to the content word.

The invention also teaches a method and system for providing cross language advertising to a user from a server on a computer network such as the Internet while the user is requesting a real time translation on contextual information in a target language contained in a page supported by the server. The system performs the following operation steps:

receiving a screen-scraped segment of text in the target language adjacent to, or overlaid by, the pointer of the user's mouse;

calibrating the screen-scraped segment of text into a query;

translating the query into a source language, such as the user's native language;

sending to the user the query's translation in the source language;

searching a database of advertisements associated with the server; and sending to the user one or more advertisements relevant to the query.

In the foregoing embodiments, the advertisements sent to the user may be any of: a hyperlink to an advertisement page in the source language, a pop-up window containing content in the source language, a flag containing content in the source language, an audio advertisement, and a non-textual visual language.

DETAILED DESCRIPTION OF THE INVENTION

The invention incorporates a system and method for providing cross language advertising service associated with translingual translation and annotation of query and search and retrieval of multilingual web documents. Such a system enables a user to read advertisements in her native language, also called as source language, while he is reading web documents in a foreign language, also called as target language.

In the first preferred embodiment of the invention, the method and system involve the basic stages of: dialectal standardization, pre-search engine translation, post search engine translation, and advertising association. The system includes one or more Internet based servers and one or more clients installed in computers via which a user may access the Internet. The use inputs a query from the computer, which is connected to the server via the Internet. The server, which is connected to a search engine through the Internet, hosts a dialectal controller, a query prompter and at least one translator. The server is also associated with a database of advertisements. In a typical deployment, as soon as a content word or a keyword is extracted from the user's query input, the server conducts a search in the database and returns to the user one or more advertisements relevant to the content word or keyword. The advertisements can be all in the source language, i.e., the user's native language. Alternatively, the advertisement can be in a target language, i.e., the foreign language, but the server translates the matching advertisements before it sends them to the user.

Figure 1:
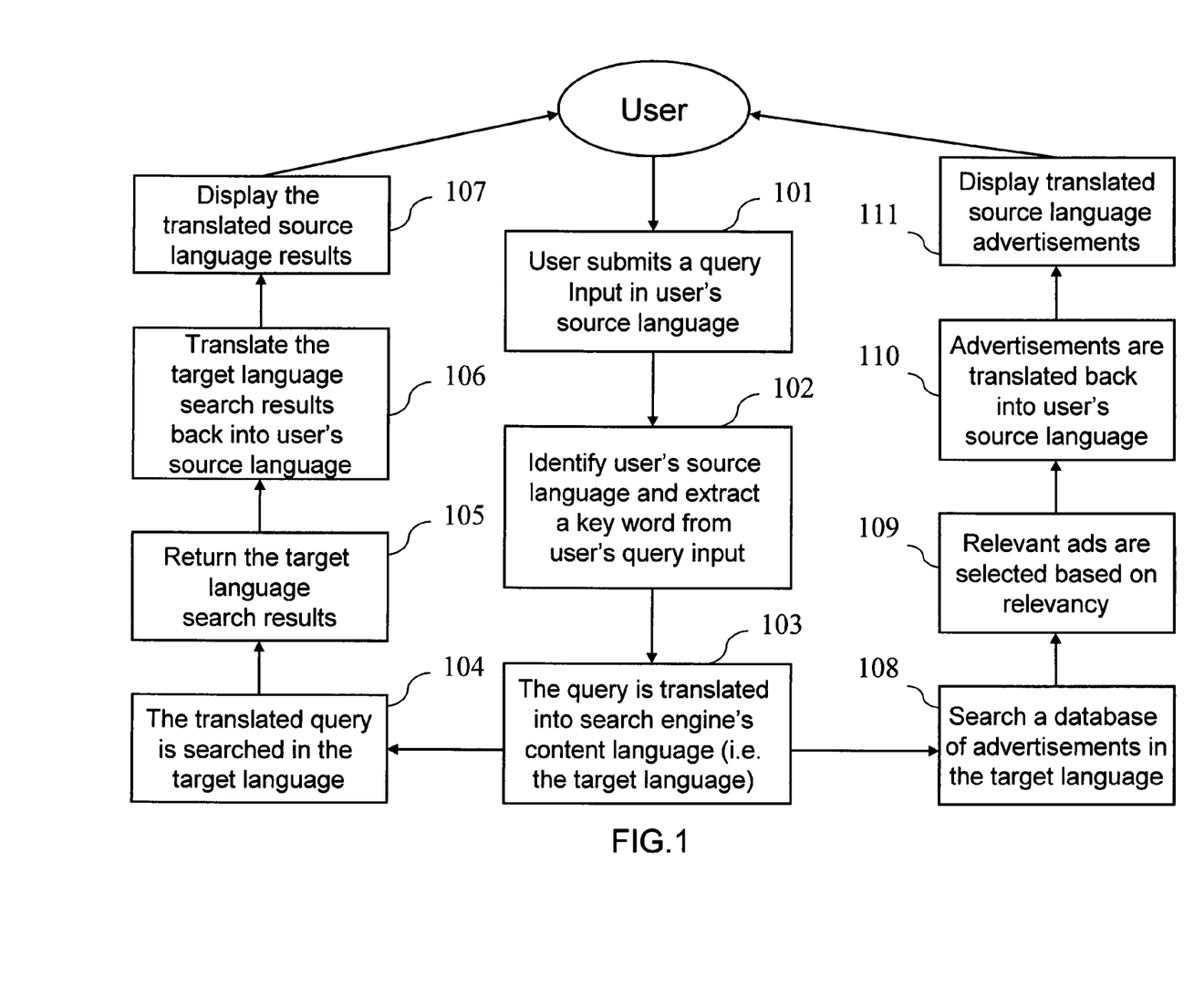
FIG. 1 is a schematic flow diagram illustrating an exemplary method for cross language advertising according to one embodiment of the invention.

FIG. 1 illustrates an exemplary method for cross language advertising according to one embodiment of the invention. The method includes the following steps:

Step 101: The user inputs a query in her native language (i.e. the source language) through an input device such as a keyboard.

Step 102: The input is received by a dialectal controller in the server which processes the query input, identifies the user's input language, and extracts a content word or keyword out of the query input.

The dialectal controller at the server backend picks up the keyword and standardizes it to a commonly known word or term. This is done to bring about a consistency in the meaning of a word notwithstanding dialectal variations. Dialectal standardization is an important step because often times words encountered have several different dialectal variations. A language such as English itself is full of dialectal variations in the form of British English and American English to name a few.

Good examples of dialectal variations in these two dialects of English include centre vs. center, lorry vs. truck, queue vs. line and petrol vs. gasoline etc. Similar instances could be cited in many of the other languages of the world, too. In Chinese, for instance there are as many as over forty different dialectal variations for just one particular word. Such instances corroborate the fact that dialectal variations are the rule rather than the exception and therefore the only way to counter them is by standardizing a query or a word to a commonly known word. The dialectal standardization is essential in the system because the identified keyword needs to be given one consistent meaning. Otherwise, a single inconsistency may result in a wrong translation and ruin the entire search process during subsequent stages of search and information retrieval.

If the dialectal controller fails to recognize the word and thus is unable to perform dialectal standardization, the server may prompt the user for more input or request the user to choose from a set of expressions to assist, to clarify and to sharpen her query. In that case the user may submit another query to the query input device. Such a query may either be a standard term or a non-standard term. For instance, different variants of the word "auto" including automobile and transportation vehicle are permitted to be input by the user as part of the dialectal standardization process.

Step 103: The dialectally standardized content word or keyword is input into a translator in the server which translates the keyword into an equivalent in the target language (i.e. the language of the search target content) and gives an output in the target language, such target language having been pre-selected by the user prior to the translation stage. In one option, a pre-determined target language can be selected as a default target language.

Step 104: The keyword in the target language, i.e. the translated keyword, is then fed into a search engine of the target language. This input sets the search engine into motion and the search engine begins searching for sites related to the particular keyword and provides an output of search results.

Step 105: The search results obtained following the search are displayed as search results on the user's screen. The search results may be of many different kinds such as titles or catalogs along with their URL links or actual web sites or web pages with contents or even sub-pages with title along with their URL links. The search results may be any or all of these.

Step 106: Depending on the user's competence level and needs, the user may either choose to view the search results so obtained in the target language itself, or she may specify that the search results be translated in whole or in part into the source language. This can be done by the user by selectively highlighting the portions that she desires to be translated and by entering an appropriate command or selecting an appropriate option. If the user chooses to have a post-search translation of the search results from the target language to the source language, the user has two available options.

The user can choose between having a machine translation of the web sites into the source language, such translation being available with reading aids. Alternatively, the user may choose a well translated version of the site into the source language. The selection of a particular kind of translation by the user depends on her particular needs. For instance, users who are totally unfamiliar with the sites in the target language may opt for machine translations with reading aids so as to get an idea about the contents of the site in a broad manner. On the other hand, users whose needs warrant a more clear, succinct and unambiguous translation of the sites will prefer well-translated sites. Well-translated sites can be user's input language (the source language) copywriter's creation, reduction or rendition based on search in the target language's original site, for the consumption of the user. They can be merchant's prepared sites (localized sites) targeted at users, based on or manually translated from search-in the target language original sites, hardwired in the server to be triggered at the time of usage.

Step 107: After the user makes the selection of the kind of translation required by her, the search results are translated to the source language and the translated results are displayed as search results on the user's screen. The search results obtained may be of many different kinds such as titles or catalogs along with their URL links or actual web sites or web pages with contents or even sub pages with title along with their URL links. The search results obtained may be any or all of these, and the user may opt to have any or all of these search results translated. The user may choose to have any or all of these different kinds of search results translated into the source language if she so desires.

Steps 108 through 111 occur concurrently with steps 104 though 107.

Step 108: As soon as the content word or keyword is translated into the target language, the server looks up the database of advertisements.

Step 109: One or more matching advertisements in the target language is selected based on the relevancy to the translated keyword.

Step 110: The advertisements are then translated into the user's source language.

Step 111: The translated advertisements are displayed on the user's screen. The displayed advertisements can be any of: a hyperlink to an advertisement page in the source language, a pop-up window containing content in the source language, a flag containing content in the source language, an audio advertisement, and a non-textual visual advertisement.

Figure 2:
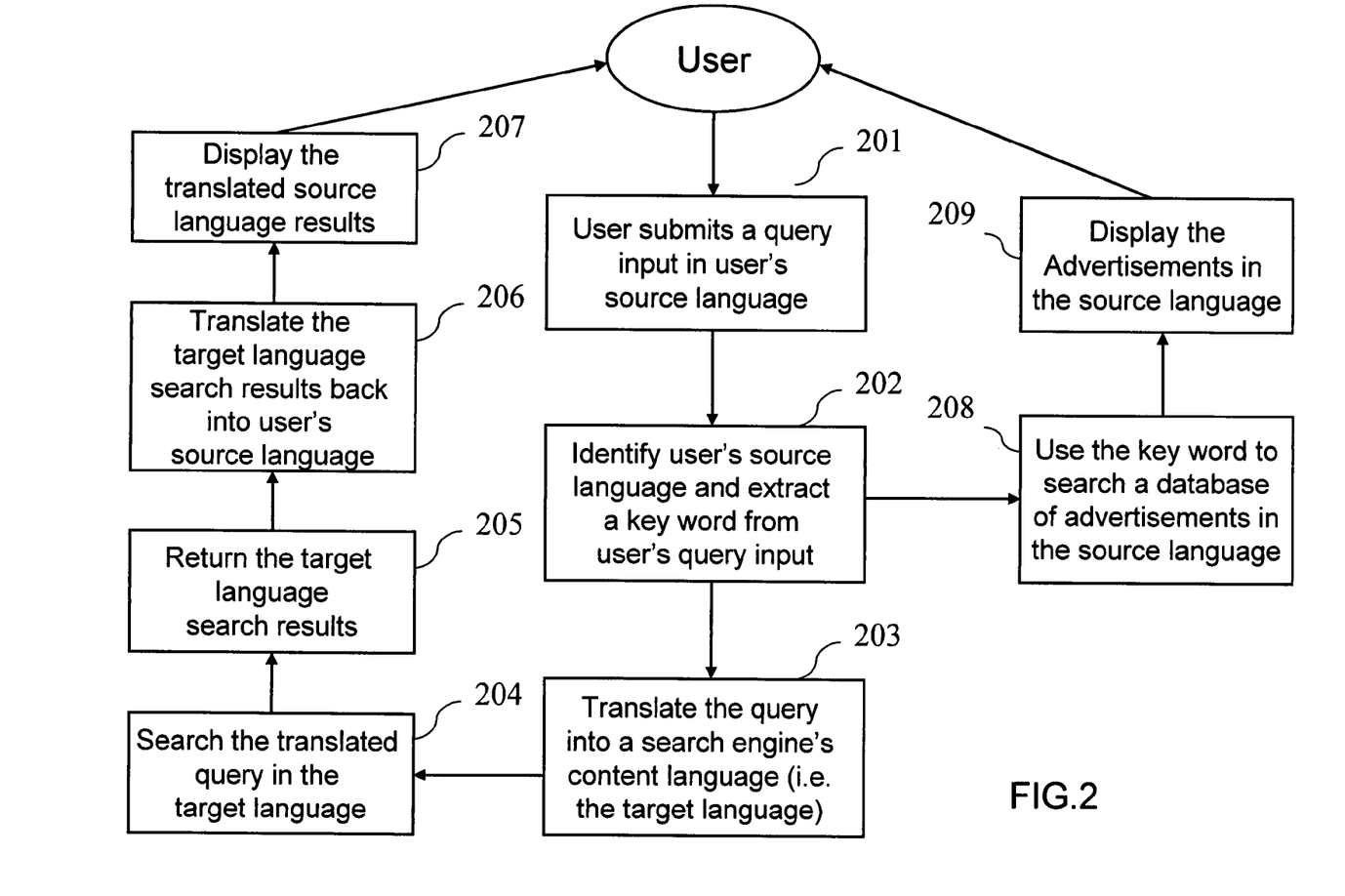
FIG. 2 is a schematic flow diagram illustrating an exemplary method for cross language advertising in an alternative deployment according to the embodiment of FIG. 1.

FIG. 2 illustrates an exemplary method according to alternative deployment of the preferred embodiment illustrated in FIG. 1. The steps 201 through 207 are substantially same as steps 101 through 107 in FIG. 1.

Step 201: The user inputs a query in her native language (i.e. the source language) through an input device such as a keyboard.

Step 202: The user's input is received by a dialectal controller in the server which processes the query input, identifies the user's input language, and extracts a content word or keyword out of the query input.

Step 203: The dialectally standardized content word or keyword is then input into a translator in the server which translates the keyword into an equivalent in the target language and gives an output in the target language, such target language having been pre-selected by the user prior to the translation stage. In one option, a pre-determined target language can be selected as a default target language.

Step 204: The translated keyword is then fed into a search engine of the target language and sets the search engine into motion.

Step 205: The search results obtained following the search are displayed as search results on the user's screen. The search results may be of many different kinds such as titles or catalogs along with their URL links or actual web sites or web pages with contents or even sub-pages with title along with their URL links. The search results may be any or all of these.

Step 206: Depending on the user's competence level and needs, the user may either choose to view the search results so obtained in the target language itself, or she may specify that the search results be translated in whole or in part into the source language. This can be done by the user by selectively highlighting the portions that she desires to be translated and by entering an appropriate command or selecting an appropriate option. If the user chooses to have a post-search translation of the search results from the target language to the source language, the user has two available options.

Step 207: After the user makes the selection of the kind of translation required by her, the search results are translated to the source language and the translated results are displayed as search results on the user's screen. The search results obtained may be of many different kinds such as titles or catalogs along with their URL links or actual web sites or web pages with contents or even sub pages with title along with their URL links. The search results obtained may be any or all of these, and the user may opt to have any or all of these search results translated. The user may choose to have any or all of these different kinds of search results translated into the source language if she so desires.

Steps 208 through 209 occur concurrently with steps 204 though 207.

Step 208: As soon as the content word or keyword is extracted, the server looks up a database of advertisements using the keyword. The advertisements are primarily in the source language. One or more of matching advertisements are selected based on the relevancy to the key word.

Step 209: Display the selected advertisements to the user. The displayed advertisements can be any of: a hyperlink to an advertisement page in the source language, a pop-up window containing content in the source language, a flag containing content in the source language, an audio advertisement, and a non-textual visual advertisement.

In another equally preferred embodiment, the cross language advertising is incorporated with the LACE, a system for dynamically returning a remote online user a bilingual annotation or translation, displayed in a mouse pointer associated callout, on the textual information contained in the website. When the user initiates a real-time annotation or translation using her mouse pointer, he is returned one or more advertisements in the user's language. The system includes a web server which supports a website on the Internet. The remote end user logs on the Internet by using a browser in her computer and visits a website. The website is in a target language, such as English. The LACE application can be activated from the web site but runs on the web site server. Upon activation of the LACE application, the user can obtain translation of or bilingual annotation on, a segment of textual information in the website by moving her mouse pointer over, or pointing the pointer at, the text that she wants to understand. For example, when the user moves the pointer over "tax preparer", a bubble or a pop-up callout comes to the screen. The callout is associated with the pointer such that a visual reference between the callout and the target text is established. At the same time, the server sends the user one or more advertisements which are relevant to the text she targeted. The displayed advertisements can be any of: a hyperlink to an advertisement page in the source language, a pop-up window containing content in the source language, a flag containing content in the source language, an audio advertisement, and a non-textual visual advertisement.

Figure 3:
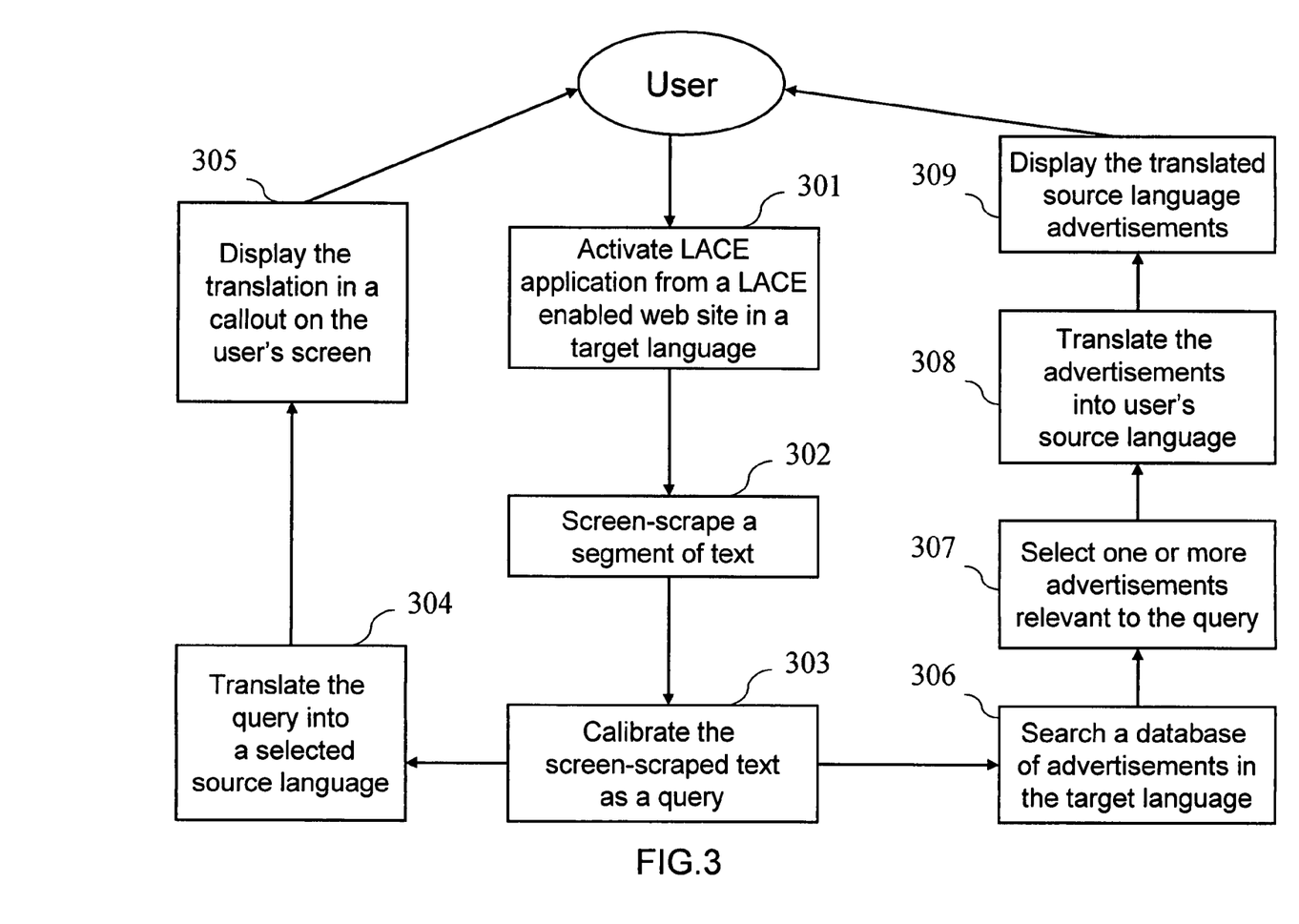
FIG. 3 is a schematic flow diagram illustrating an exemplary method for cross language advertising according to another embodiment of the invention.

FIG. 3 is a block diagram illustrating a method for cross language advertising according to the above described embodiment of the invention. The method includes the operation steps of:

Step 301: By entering a URL or by clicking a hyperlink, the user accesses to a website hosted by a web server. The website is in a target language, such as English. When the user wants to see bilingual annotation on some words, phrases, or sentences in the website, she needs to activate the LACE application and selects a source language, such as Chinese, from a list.

Step 302: As soon as the source language is selected, a screen-scraping application, which is a part of the LACE application, is associated with the user's mouse pointer. Following a number of predefined rules represented by an algorithm, the screen-scraping application takes a segment of text which falls in a region spatially close to the pointer and sends the scraped segment of text back to the server via HTTP.

Step 303: The server standardizes the scraped segment of text into a query.

Step 304: The server translates the query by looking up a powerful multilingual database.

Step 305: The server returns the requested translation or annotation, including even other reading aid information, together with the meta-data necessary for defining the callout for the annotation, to the user's computer.

Steps 304 through 305 occur concurrently with steps 306 through 309.

Step 306: As soon as the screen-scraped text was calibrated as a query, the server looks up a database of advertisements which are primarily in the target language.

Step 307: One or more matching advertisements in the target language is selected based on the relevancy to the query.

Step 308: The advertisements are then translated into the user's source language.

Step 309: The translated advertisements are displayed on the user's screen. The displayed advertisements can be any of: a hyperlink to an advertisement page in the source language, a pop-up window containing content in the source language, a flag containing content in the source language, an audio advertisement, and a non-textual visual advertisement.

Figure 4:
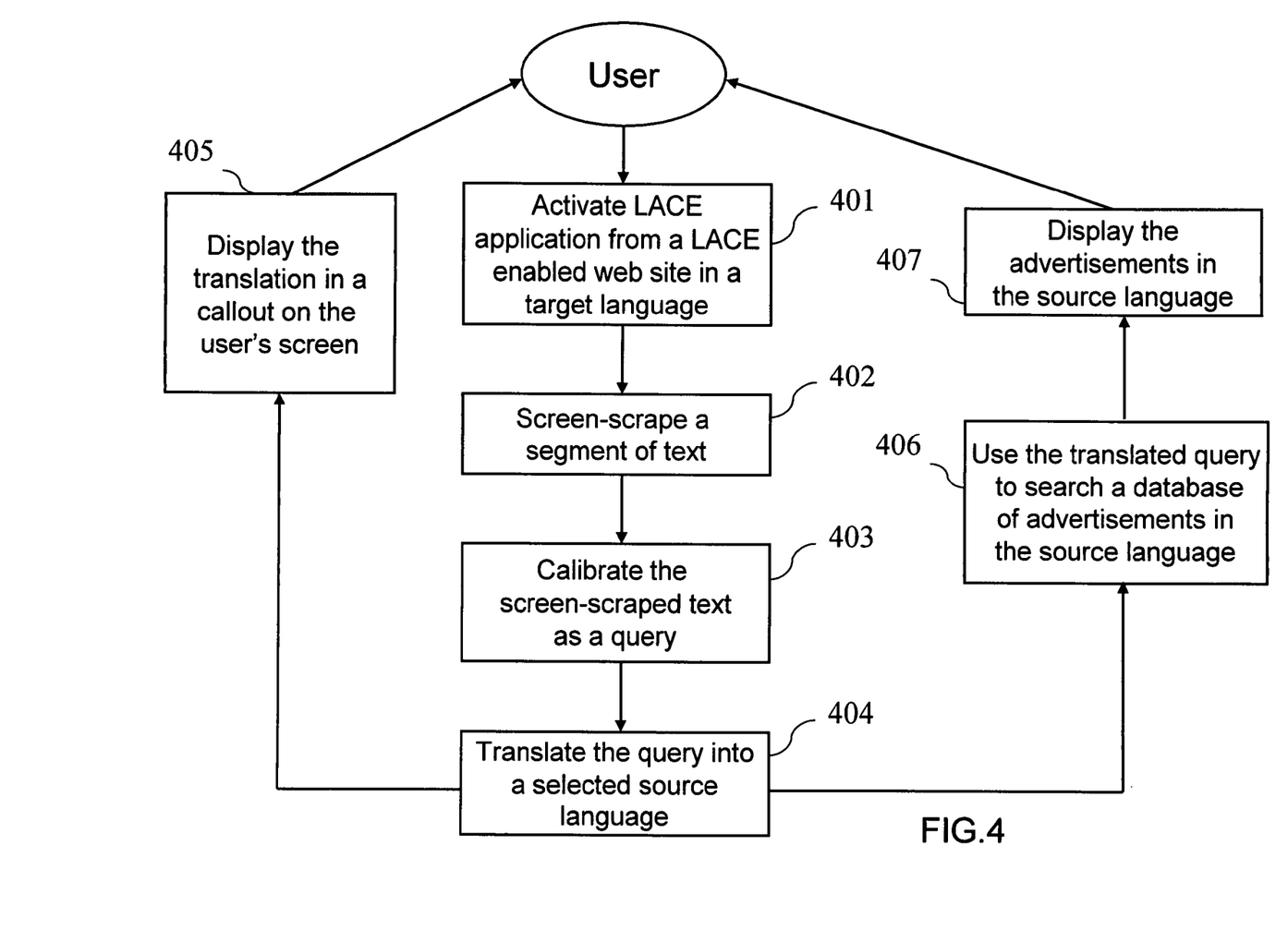
FIG. 4 is a schematic flow diagram illustrating an exemplary method for cross language advertising in an alternative deployment according to the embodiment of FIG. 3.

FIG. 4 is a block diagram illustrating an exemplary method for cross language advertising according to an alternative deployment of the embodiment illustrated in FIG. 3. Steps 401 through 404 are substantially same as steps 301 through 304 in FIG. 3.

Step 401: The user activates the LACE application and selects a source language, such as Chinese, from a list.

Step 402: As soon as the source language is selected, a screen-scraping application, which is a part of the LACE application, takes a segment of text which falls in a region spatially close to the pointer and sends the scraped segment of text back to the server via HTTP.

Step 403: The server standardizes the scraped segment of text into a query.

Step 404: The server translates the query by looking up a powerful multilingual database.

Step 405: The server returns the requested translation or annotation, including even other reading aid information, together with the meta-data necessary for defining the callout for the annotation, to the user's computer.

Steps 406 through 407 occur concurrently with step 405.

Step 406: As soon as the query is translated into a selected source language, the server looks up a database of advertisements using the translated query. The advertisements are primarily in the source language. One or more of matching advertisements are selected based on relevancy.

Step 407: Display the selected advertisements to the user. The displayed advertisements can be any of: a hyperlink to an advertisement page in the source language, a pop-up window containing content in the source language, a flag containing content in the source language, an audio advertisement in the source language, and a non-textual visual advertisement.

The LACE system according to the embodiment illustrated in FIG. 3 and FIG. 4 is a cross platform application which runs primarily on the backend server. The application includes an activation means which is implemented as a graphical user interface embedded in each page of the website. When the user accesses the website, she can activate or deactivate the LACE application from any page. As an example, the user activates or deactivates the application by clicking an activation button. In another deployment, the user activates or deactivates the application by choosing from a dropdown menu. Yet in another deployment, the application is automatically deactivated when the user leaves the web site. These methods for activation and deactivation can be combined in one way or another as long as it is convenient to the user.

The LACE application also includes a selection means for selecting one or more subject languages from a list of options. Similar to the activation means, the selection means can be deployed as a dropdown menu, a number of iconic buttons (each of which representative of a language), or any other elements incorporated in a graphical user interface or a web page. The activation means and the selection means described above can also be incorporated in one way or another. For example, when the user selects a language from a list of options, the LACE application is automatically activated. To deactivate the application, the user may choose "deactivate LACE" from the list or by clicking an icon. The callout or the "bubble" can be configured in any shape, any color, any background, and any size. In addition, the user can set the font style and size used in the callout or "bubble", just like setting font in most of word processing applications and messaging applications.

The difference between a callout and a "bubble" is that the former has a body and a tail, but the latter has a body only. The tail is useful because it is often used as a reference connector between the annotation callout and the textual information which is annotated. Although a callout is preferably used in various embodiments of this invention, it does not deviate from the essence and scope of this invention if some other kind of visual cue such as square, rectangle, circle, bubble, a "kite" or a "halo" is used to display the returned annotation message. As an example, the callout can be configured to a fixed size. In this case, only a limited number of characters can be displayed in the callout. When the pointer moves, the callout, like a moving window, only shows the bilingual annotation on the words which are spatially closer to the pointer. The annotation on the words which are getting farther from the pointer automatically disappears from the callout. As another example, the user can configure a sentence-by-sentence translation scheme. In this case, when the pointer moves over a sentence, the translation of the sentence is displayed in the bubble. Because some sentences are long and some are very short, a flexible bubble is most appropriate. The LACE application scrapes text from the screen following a number of predefined rules, for examples: only the text in a line most close to the pointer is scraped; one inch of the segment in the left (or right) of the pointer is scraped; only the segment one inch to the right and one inch to the left of the pointer is scraped; or a whole is scraped, etc.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method for providing cross language advertising for a user while the user is performing a contextual search and retrieval of documents in a computer network, the method comprising the steps of:
   receiving from the user through an input device a query in a first language;
   processing the query to extract at least one content word from the query;
   performing dialectal standardization of the content word extracted from the query;
   translating the dialectally standardized content word into a second language through a translator;
   performing a contextual search in the second language based on the translated content word, using a search engine in the second language;
   returning to the user the search results in the second language in the form of at least one of site names (URLs) and documents;
   searching a database of advertising cues; and
   returning to the user one or more of the advertising cues relevant to the content word.

2. The method of claim 1, wherein the advertising cues comprise any of:
   a hyperlink to an advertisement page in the first language;
   a pop-up window containing content in the first language;
   a flag containing content in the first language;
   an audio advertisement; and
   a non-textual visual advertisement.

3. The method of claim 1, further comprising the step of:
   prompting the user for another query if a content word is not successfully extracted from the initial query input.

4. The method of claim 1, further comprising the step of:
   offering the user at least one translation of all or portion of the search results obtained in the second language into the first language.

5. The method of claim 4, wherein the at least one translation is selected from any of:
   a collection of machine translations with reading aids; and
   a collection of translated pages,
   wherein the collection of machine translations with reading aids and the collection of translated pages are provided by a server associated with the computer network.

6. The method of claim 5, wherein the server updates the collection of translated pages with revisions or additional copies, and wherein the translated pages are translations made in accordance with the user's needs.

7. A system for providing cross language advertising for a user while the user is performing a contextual search and retrieval of documents in a computer network, comprising:
   at least one server; and
   at least one database of advertising cues associated with the at least one server;
   wherein the at least one server comprises:
      means for receiving from the user through an input device a query in a first language;
      a dialectal controller for dialectally standardizing a content word extracted from the query;
      a first translator for translating the dialectally standardized content word into a second language;
      a search engine for searching in the second language, the site names (URLs), pages and descriptions satisfying at least one search criterion;
      at least a second translator for translating the search results into the first language;

means to search the database of the advertising cues based on the relevancy to the translated content word; and means to send the search results and the matching advertising cues to the user's computer screen.

8. The system of claim 7, wherein the advertising cues comprise any of:

a hyperlink to an advertisement page in the first language;
a pop-up window containing content in the first language;
a flag containing content in the first language;
an audio advertisement; and
a non-textual visual advertisement.

9. The system of claim 7, wherein the server further comprises:

mean for prompting the user for another query if the dialectal controller failed to extract a content word from the initial query input by the user.

10. The system of claim 9, wherein the second translator allows the user to selectively choose to translate all or portions of the search results obtained in the second language into the first language.

11. The system of claim 10, wherein the second translator can provide the user with, and allows the user to choose from, either of:

a collection of machine translations with reading aids; and
a collection of translated pages.

12. The system of claim 11, wherein the server updates the collection of translated pages with revisions or additional copies, and wherein the translated pages are translations made in accordance with the user's needs.

13. A method for providing cross language advertising to a user from a server on a computer network while the user is requesting a real time translation on a contextual information in a first language contained in a page supported by the server, the method comprising the steps of:

receiving a screen-scraped segment of text adjacent to, or overlaid by, the user's pointer;
calibrating the screen-scraped segment of text into a query;
translating the query into the second language;
sending to the user the query's translation;
searching a database of advertising cues associated with the server; and
sending to the user one or more advertising cues relevant to the query.

14. The method of claim 13, wherein the advertising cues comprise any of:

a hyperlink to an advertisement page in the second language;
a pop-up window containing content in the second language;
a flag containing content in the second language;
an audio advertisement; and
a non-textual visual advertisement.

15. The method of claim 13, wherein the query's translation is displayed in a visual cue on the user's screen.

16. The method of claim 14, wherein the visual cue's position is dynamically associated with the user's pointer, and wherein the visual cue is adaptive to fit the content therein.

17. A system for providing cross language advertising to a user from a server on a computer network while the user is requesting a real time translation on a contextual information in a first language contained in a page supported by the server, the system comprising an application which operates to:

screen-scrape a segment of text adjacent to, or overlaid by, the user's pointer;
calibrate the screen-scraped segment of text into a query;
translate the query into a second language;
display the query's translation in a visual cue on the user's screen; and
display one or more advertising cues in the second language relevant to the query.

18. The system of claim 17, wherein the advertising cues comprise any of:

a hyperlink to an advertisement page in the second language;
a pop-up window containing content in the second language;
a flag containing content in the second language;
an audio advertisement; and
a non-textual visual advertisement.

19. The system of claim 17, wherein the application comprises a graphical user interface embedded in each page of the web site, the graphical user interface comprising:

means for activation or deactivation of the application;
means for selecting the second language from a list of languages; and
means for setting parameters of the visual cue;
wherein the application is automatically activated when the second language is selected.

20. The system of claim 19, wherein the visual cue's position is dynamically associated with the user's pointer, and wherein the visual cue is adaptive to fit the content therein.

* * * * *